(12) United States Patent
Fields

(10) Patent No.: US 7,661,620 B2
(45) Date of Patent: Feb. 16, 2010

(54) PERSONAL ACCESSORY CARRYING DEVICE

(76) Inventor: Waddell K. Fields, 2014 Quinton Pl., Suwanee, GA (US) 30024

( * ) Notice: Subject to any disclaimer, the term of this patent is extended or adjusted under 35 U.S.C. 154(b) by 871 days.

(21) Appl. No.: 11/371,510

(22) Filed: Mar. 8, 2006

(65) Prior Publication Data

US 2007/0213104 A1    Sep. 13, 2007

(51) Int. Cl.
    *B65H 75/48* (2006.01)
(52) U.S. Cl. .................. 242/379; 224/162; 224/217; 242/382; 379/446; 439/501; 455/575.6
(58) Field of Classification Search .............. 455/575.6; 224/162, 217; 242/379, 382; 379/446; 439/501
    See application file for complete search history.

(56) References Cited

U.S. PATENT DOCUMENTS

| | | | |
|---|---|---|---|
| 3,968,670 A | 7/1976 | Quenot | 70/456 R |
| 5,280,635 A | 1/1994 | Knoedler | 455/128 |
| 5,533,655 A | 7/1996 | Duque | 224/602 |
| 5,610,979 A | 3/1997 | Yu | 379/455 |
| 5,833,165 A | 11/1998 | Paugh | 242/379.2 |
| 5,938,137 A | 8/1999 | Poulson | 242/379 |
| 6,149,043 A | 11/2000 | Goto | 224/669 |
| 6,152,392 A | 11/2000 | Hawkins | 242/379 |
| 6,182,169 B1 | 1/2001 | Force et al. | 710/62 |
| 6,206,257 B1 | 3/2001 | Peele | 224/197 |
| 6,257,469 B1 | 7/2001 | Cohn | 224/162 |
| 6,290,158 B1 * | 9/2001 | Huang | 242/379 |
| 6,357,646 B1 | 3/2002 | Gur | 224/683 |
| 6,364,237 B1 | 4/2002 | Kagel | 242/379 |
| 6,434,797 B1 | 8/2002 | Sagman | 24/3.13 |
| 6,502,727 B1 * | 1/2003 | Decoteau | 224/162 |
| 6,546,103 B1 * | 4/2003 | Wong | 379/446 |
| 6,958,698 B2 | 10/2005 | Maloney | 340/572.8 |
| 6,978,153 B2 | 12/2005 | Davie et al. | 455/550.1 |
| 7,007,882 B2 * | 3/2006 | Raia et al. | 242/379 |
| 7,354,304 B2 * | 4/2008 | Livingston | 439/501 |
| 2003/0042348 A1 | 3/2003 | Salentine et al. | 242/380 |
| 2005/0072819 A1 | 4/2005 | Maldonado et al. | 224/162 |
| 2005/0247089 A1 | 11/2005 | Booker | 70/456 |
| 2005/0263226 A1 | 12/2005 | Smithers | 150/113 |
| 2008/0042000 A1 * | 2/2008 | Horton | 242/382 |
| 2008/0083797 A1 * | 4/2008 | Myers | 224/217 |

FOREIGN PATENT DOCUMENTS

WO    WO 02/063993    8/2002

OTHER PUBLICATIONS

Abstract and drawings of FR 2777758, published Oct. 29, 1999, Inventor Doller Christian.

* cited by examiner

*Primary Examiner*—Matthew D Anderson
*Assistant Examiner*—April S Guzman

(57) ABSTRACT

The present invention is directed toward a carrying device enabling hands-free transporting of a personal data assistant, cellular telephone, pager, MP3 Player, media player, hand held game, hand held GPS device or any other personal accessory or hand held device that may be attached to the body of a user. The device enables a detachment of the handheld device from a housing while maintaining a secured link of the hand held device to the user's body with and automatic facilitated comfortable adjustment of a secure link of the hand held device, thereby providing hand-free carrying and an elimination of risk of loss from accidental misplacement.

18 Claims, 9 Drawing Sheets

PERSONAL ACCESSORY CARRYING DEVICE

TECHNICAL FIELD

The present invention is directed to a device that enables hands-free transportation of and the tethering of hand held devices being transported. More particularly, the present invention is directed to an apparatus that maintains a secured link to portable, hand held devices and such device covers and carrying cases.

BACKGROUND OF THE INVENTION

Devices that enable the hands free transportation of personal hand held electronic device have been around in various implementations for quite some time, and most recently have decreased in size, in accordance with the decrease in size of electronic devices, to the point where users of such devices and transportation systems may now attach both to their body. The problem with attaching these devices to the body with belt/body mount systems currently in the market is that these mount systems do not facilitate quick access to the devices that are secured and supported within these mount systems. Most belt/body mount systems have a security function that facilitates securing the device mounted while a user is engaged in a high level of activity such as exercising or driving. This function is a plus when a user is engaged in a high level of activity. However, it may be a detriment when driving for example. It is extremely difficult to gain access to a cell phone, PDA, pager or any other electronic device that is secured within a case when using one hand.

Another problem is that these electronic devices are not immune from theft while engaged with a belt/body mount system. For example in crowded areas, such as on a bus or at sporting events where individuals are constantly bumping into each other, many individuals have expensive devices stolen from pockets or off of a purse or belt mount because, upon removal of the device from the mount, the device is not attached to the secured system. Moreover, many users do not regularly engage the security feature of belt/body mount systems in an effort to cut down on the time required to access the phone. For example if a cellular phone is ringing, calls may be missed while trying to unlock or disengage the security feature on some belt mounts.

Tethering devices have been combined with such belt/body mount system to add another layer of security. Such tethering systems have extendable and retractable cables or lines ("cables"), with many of the cables being automatically retracted under the bias of an internal spring arrangement. United States Patent Application Publication Number US2003/0042348 discloses a retractable tether, which may be used in conjunction with personal communication devices (such as a cell phone, pager or PDA) and a mounting system for the prevention of loss or damage. The retracting tether may be clipped to a belt, pants or purse next to the mounting system in which the device is being held or stored. The retractable tether allows the device to be easily used while connecting to the retracting tether. The problem with such systems is that the retractable tether has to be used in conjunction with an additional clip mount, holster or storage pocket. As such, the tethering system becomes an additional component thereby requiring that individuals use more devices instead of fewer.

As technology has advanced and costs for portable electronic devices have decreased, a growing majority of individuals are relying upon devices such as PDAs, handheld games, GPS devices, portable communication devices, cellular telephones, pagers, MP3 players and other media devices to coordinate their busy lives. Their increasing affordability, accessibility and performance, coupled with decreasing device dimension requirements, have continued to expand the user market.

In the past, most users of such devices were businesspersons. With the explosion of technological advances, almost everyone, including children use at least one of these devices (PDAs, handheld games, GPS devices, portable communication devices, cellular telephones, pagers, MP3 players and other media devices) as part of everyday living. Children carry MP3 players, game players or cellular phones. Parents often rely upon pagers or cellular telephones to coordinate childcare pickups, avoiding potentially lengthy and lonely waits for their children. Furthermore, many individuals consider their wireless telephone to be a lifesaving device to be relied upon in an emergency situation for the ability to place an emergency call without having to locate a payphone.

Accidental loss or destruction of personal communication devices is at the least an expensive, time consuming inconvenience when insurance on such devices does not replace the total cost of such devices and data stored within such devices cannot be reconstructed from other sources. When data is irreplaceable, loss or destruction of such electronic devices can be devastating. Furthermore, the loss and or destruction of a phone because it has been dropped can prevent an emergency call in a potentially life-threatening situation. The prevention of such loss and destruction is of utmost importance.

Therefore it is readily apparent that there is a need for a single personal accessory transportation device that has applicability across all devices, and enables easy accessibility and usage thereof, wherein accidental misplacement or destruction of hand held devices is prevented and hands-free transportation is provided without requiring the use of multiple systems.

SUMMARY OF THE INVENTION

The present invention is a personal accessory carrying device wherein a resiliently wound mechanism acts to enable comfortably adjustable linked access to a personal accessory, thereby providing hands-free carrying and virtually eliminating risk of loss from accidental misplacement destruction.

According to its major aspects and broadly stated, the present invention is a personal accessory carrying apparatus, comprised of a housing having a chord and a spring within the housing wherein the chord is extendable from and retractable into the housing under the tension of the spring. The housing has a stud portion of a snap fastener extending from one side. A chord connector is attached to an end of the retractable chord. A connection disc having a rivet positioned through its center has an adhesive tape on one side of the disc for engaging a personal communication device or a personal communication device holder. The rivet flanges out to stabilize the rivet and keep it from moving. The device also includes a connection fillet generally in the shape of a lollipop that has first and second ends, wherein the connection fillet also has the rivet extending through the first end of the connection fillet and thereby connects the connection fillet to the connection disc. The connection fillet also has a socket portion of a snap fastener extending from a second end of the connection fillet. The chord connector is also connected to the connection fillet. During use of the device, the socket and stud portions of the snap fastener are engaged to detachably connect the connection fillet and connection disk to the housing.

More specifically, the present invention is a personal accessory-carrying device adapted to be worn by a user, wherein a personal accessory is secured thereto and resilient access is provided thereby.

A feature and advantage of the present invention is the ability of such a device to provide a personal accessory carrying device that is simple in construction and easy to manufacture.

A feature and advantage of the present invention is the ability of such a device to provide hands-free carrying of a PDAs, GPS devices, hand held games, cellular telephones, pagers, MP3 players, MPEG-4 players, or any other personal communication device.

A feature and advantage of the present invention is the ability of such a device to prevent accidental misplacement of a personal accessory.

A feature and advantage of the present invention is the ability of such a device to allow easy user-accessibility to a personal accessory.

A feature and advantage of the present invention is the ability of such a carrying device to resiliently link a personal accessory to a user.

A feature and advantage of the present invention is to provide a device that prevents the dropping, slipping or falling of a personal accessory from out of a pocket, a briefcase or one's hands.

A feature and advantage of the present invention is the ability of such a device to allow secure user carriage thereof while preventing limitations of usage locations.

These and other objects, features and advantages of the invention will become more apparent to one skilled in the art from the following description and claims when read in light of the accompanying drawings.

These and other features and advantages of the present invention will become apparent after a review of the following detailed description of the disclosed embodiments and the appended claims.

DETAILED DESCRIPTION

In describing the preferred and alternative embodiments thereof, as illustrated in FIGS. 1 through 9, specific terminology is employed for the sake of clarity. The invention, however, is not intended to be limited to the specific terminology so selected, and it is to be understood that each specific element includes all technical equivalents that operates in a similar manner to accomplish similar functions.

Generally, the present invention is an apparatus configured to attach a handheld device such as a GPS device, PDA, cell phone, pager, MP3 player or other media player or game players to the body of a user. The apparatus is a housing, connection fillet and chord wherein the chord is within the housing and is extendable from and retractable into the housing under the tension of a spring. The connection fillet is detachable from the housing by a snap fastener and permanently connected to an end of the chord. The housing has a configuration that allows for the attachment of a first portion of the snap fastener to a first side of the housing and a rotatable clip attached to the second side of the housing. A chord connector is attached to one end of the chord and to the connection fillet. A connection disc, having an adhesive on a first side that is used to connect the connection disk to a handheld device or a device pouch or holder, has a rivet extending through its center that facilitates the connection of the connection disc to an end of the connection fillet. The connection fillet has first and second ends and has a blade shape. The rivet that extends through the connection disc also extends through a first end of the connection fillet and thereby connects the connection fillet to the connection disc in a manner that facilitates the rotation of the connection fillet around the axis extending through the rivet. The rivet flanges out as it extends through the connection fillet and the connection disk to stabilize the rivet and keep it from moving. The connection fillet also has a second portion of a snap fastener attached to its second end. The first and second snap fastener portions are engaged to connect the connection fillet to the housing. In the preferred embodiment, the end of the connection fillet through which the socket portion and cap of the snap fastener are connected has a larger circular area wherein the connection fillet resembles a lollipop. The chord connector is connected to the connection fillet to facilitate a tethered link of the device to which the apparatus is connected, while the device is in use and the first and second snap fastener portions are not engaged. The weight of the device or device pouch/holder is not sufficient to cause the chord within the housing to completely extract from the housing.

Figure 7:
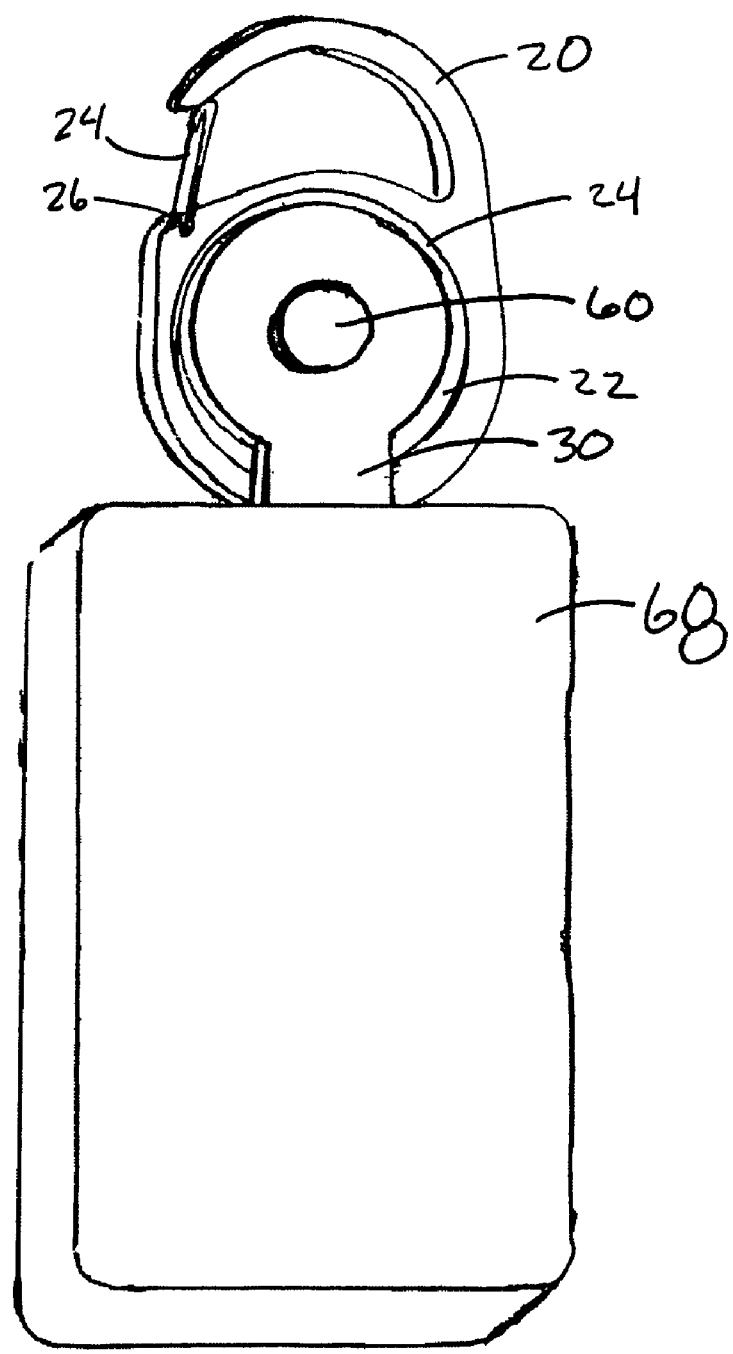
FIG. 7 is a front perspective view of a personal accessory carrying device illustrating the connection of the device to hand held device carrier case while the chord is retracted into the device housing according to an embodiment of the present inventions.
Figure 8:
FIG. 8 is a front perspective view of a personal accessory carrying device being worn by a user illustrating the connection of the device to hand held device carrier case while the chord is retracted into the device housing according to an embodiment of the present inventions.

A first embodiment of the apparatus is illustrated in FIG. 1 through 4. An alternative embodiment of the apparatus is illustrated in FIGS. 7 and 8 whereby the apparatus illustrated in FIGS. 7 and 8 is an apparatus configured to mount a handheld device to a user's body wherein the apparatus does not include the connection disc of the preferred embodiment. The embodiment illustrated in FIGS. 7 and 8 is configured to allow a device housing to be riveted directly to the connection fillet, thereby facilitating the rotation of the connection fillet around the axis extending through the rivet connecting the device housing and the connection fillet.

Figure 1:
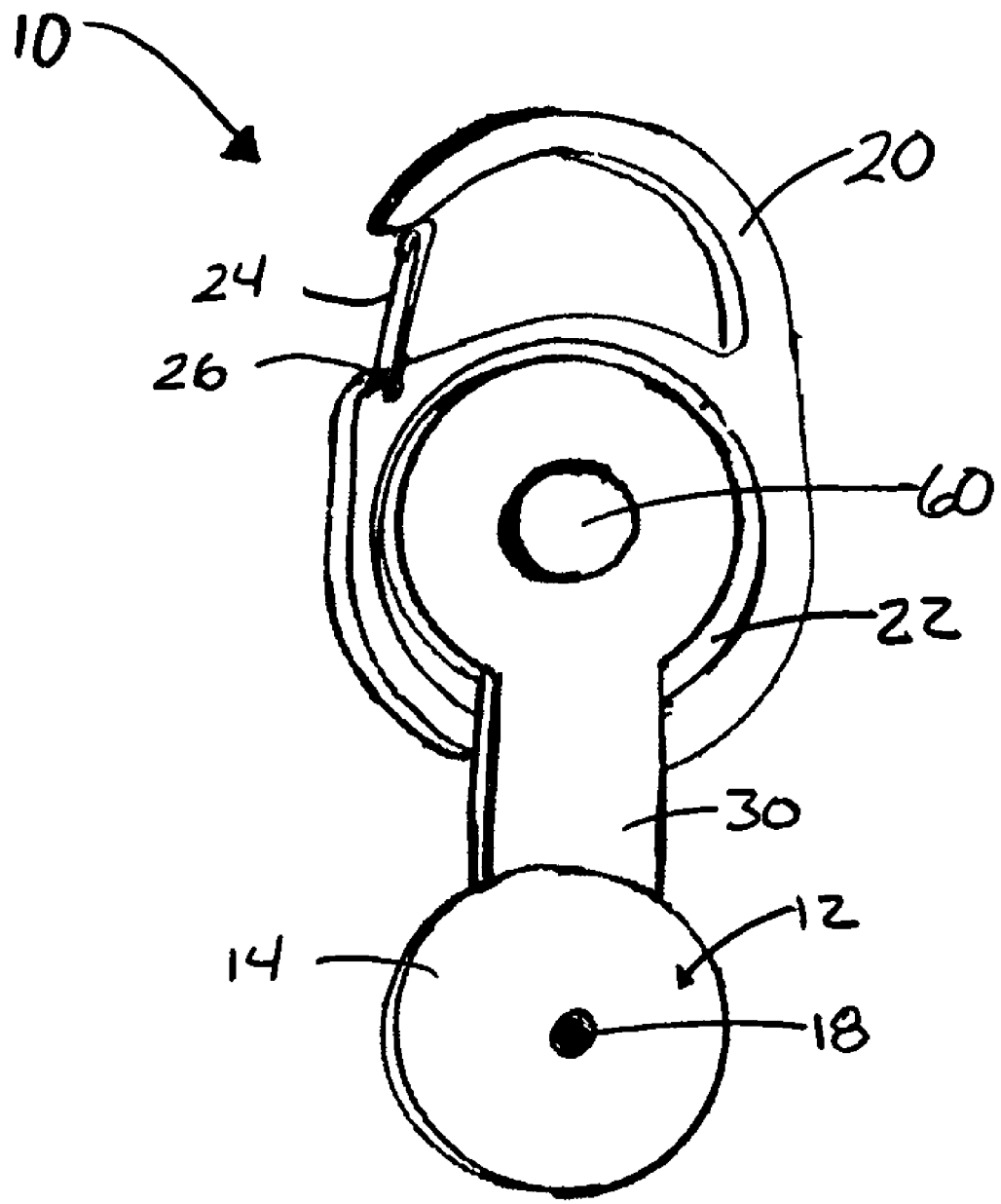
FIG. 1 is a front perspective view of a personal accessory-carrying device according to an embodiment of the present inventions.
Figure 4:
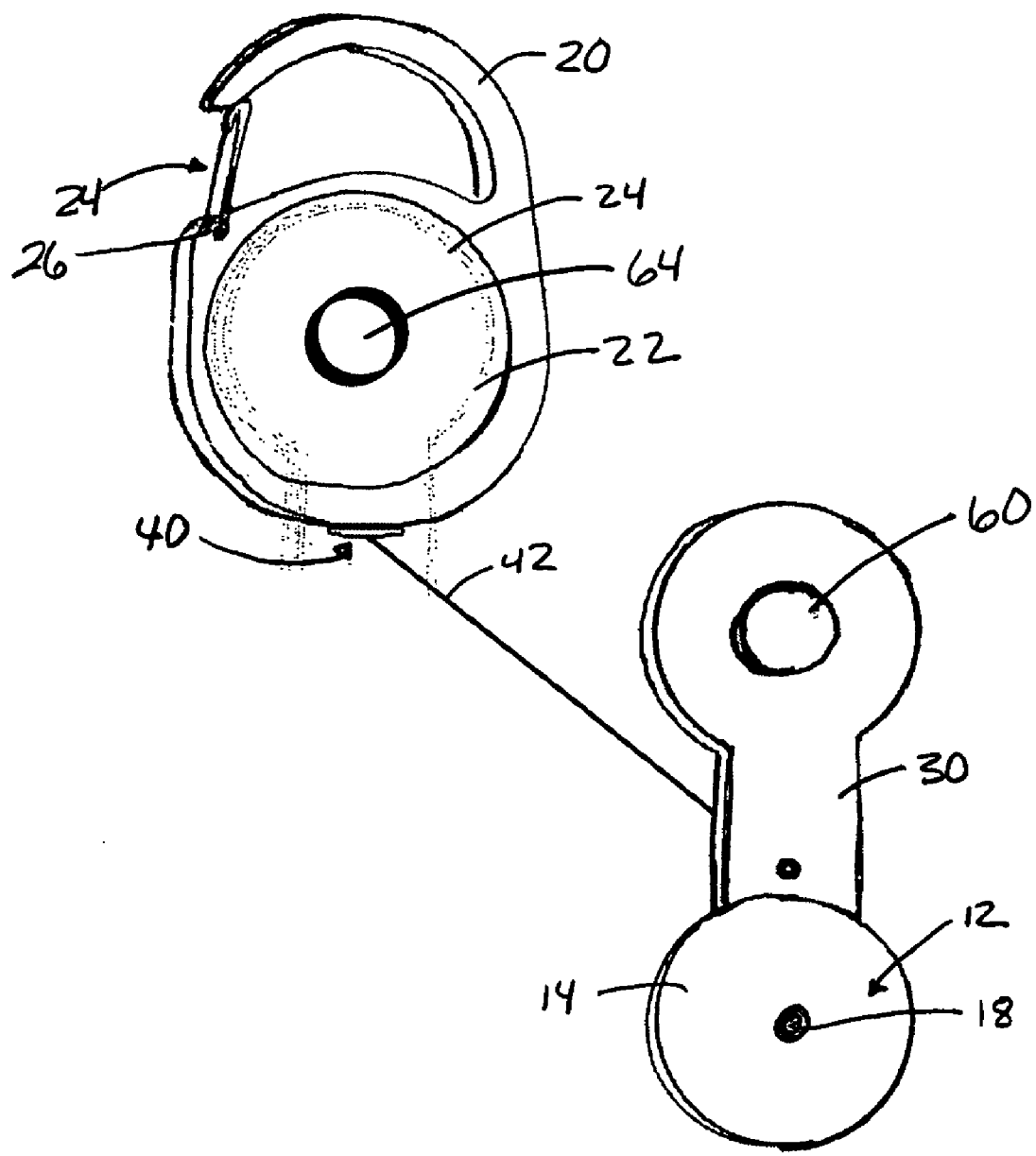
FIG. 4 is a front perspective view of a personal accessory-carrying device illustrating the extraction of the chord from the housing according to an embodiment of the present inventions.

Referring to FIGS. 1 and 4, the present invention is a personal accessory carrying device 10 comprising a body connector 20 a central connector housing 22 a carabiner clip 24 that rotates about an axis 26, a chord 42 and a connection fillet 30. The body connector 20 is engaged by a snap fastener 60 thereby connecting the connection fillet 30 to the body connector 20. The connection fillet 30, in the preferred embodiment, is comprised of a polypropylene material. However, it is to be understood that the connection fillet 30 may be comprised of any flexible material that enables a durable connection of the components and capable of withstanding force of a type similar to that which can be exerted by a user. In an alternative embodiment, the connection fillet 30 may be comprised of nylon. A connection disc 12 is connected to the connection fillet 30 by a first rivet 18 that extends through a first end of the connection fillet 30 and proximately through the center of connection disc 12. In the present embodiment the connection disc 12 is comprised of a nylon material. However, it is to be understood that the connection disc may be comprised of any martial that facilitates the adhesive connection of the connection disc to other device surfaces. In an alternative embodiment, the connection disc was comprised of polypropylene. The first rivet 18 facilitates the rotation of the connection fillet 30 around an axis extending through the center of the first rivet 18. The connection disc 12 has a first side 14 and a second side 16 wherein the first side 14 has an adhesive tape on its surface. In the present embodiment, the adhesive tape used is sold 3M Company, a product called 3M 9500 adhesive. The adhesive tape facilitates the secure connection of the connection disc 12 to any handheld communication device to which the hand held personal accessory carrying apparatus 10 is connected. It may also facilitate the connection of the hand held personal accessory carrying apparatus 10 to an accessory holder/pouch or device protector (not shown).

Figure 2:
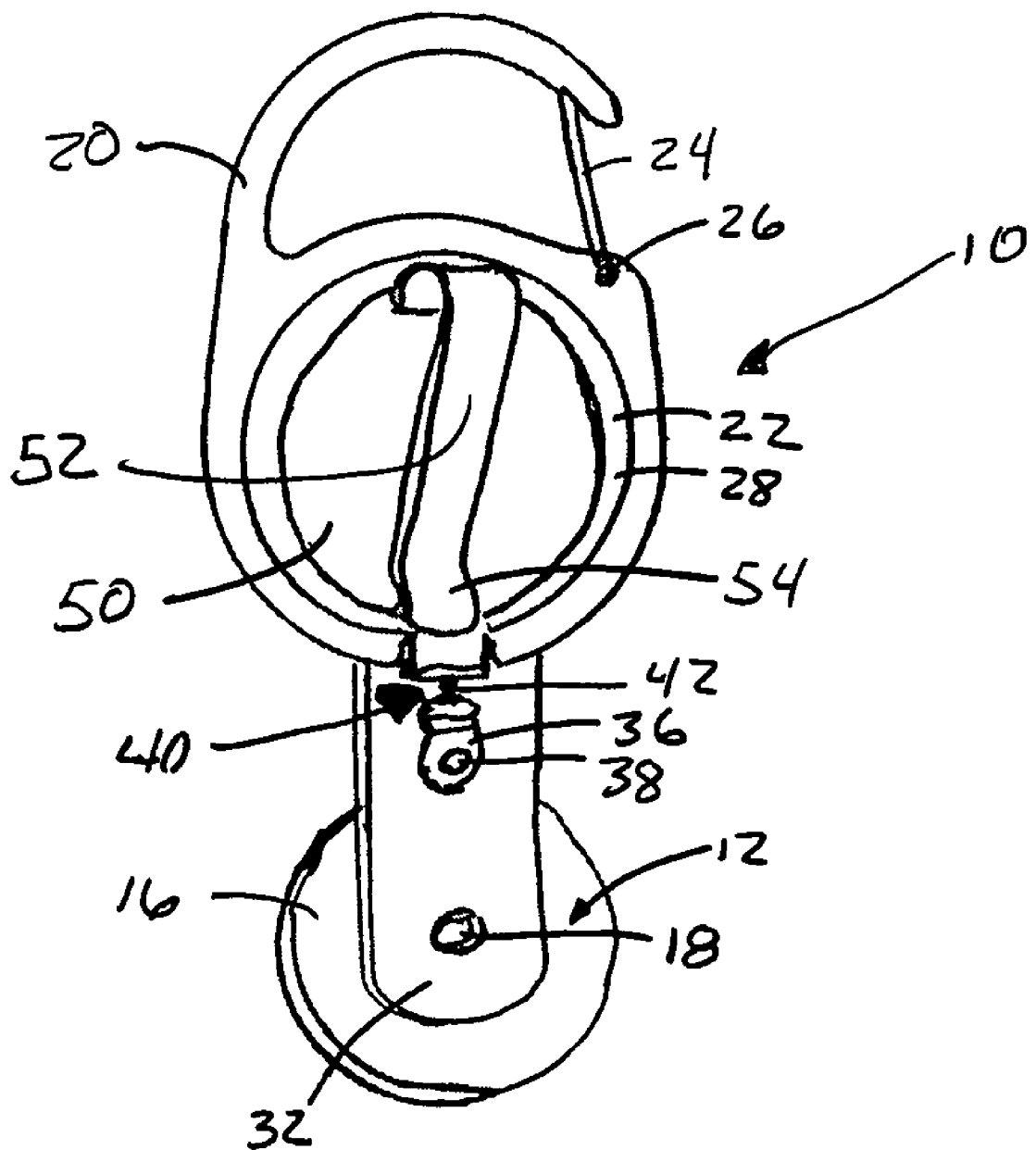
FIG. 2 is a rear perspective view of a personal accessory carrying device according to an embodiment of the present inventions.
Figure 3:
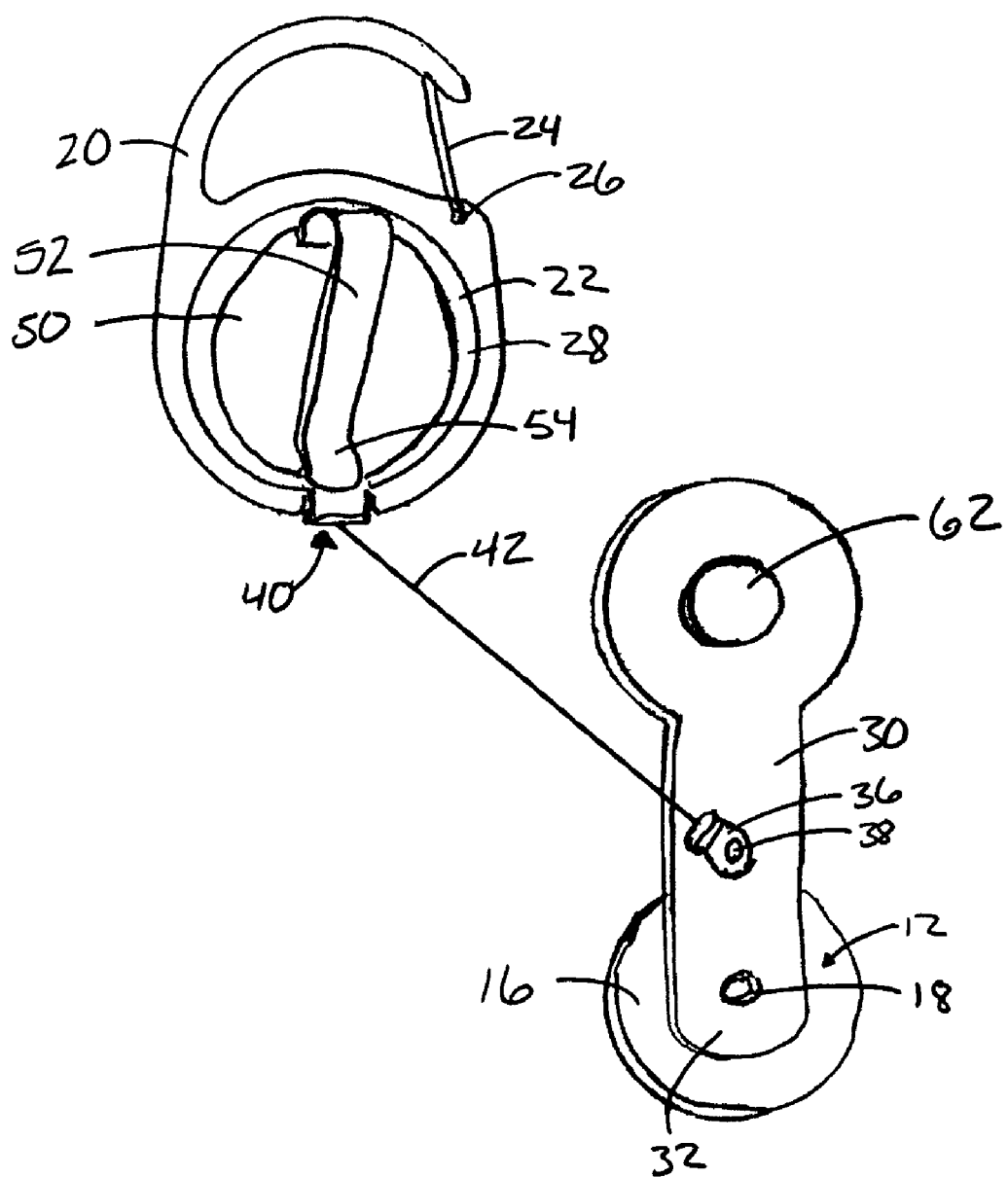
FIG. 3 is a rear perspective view of a personal accessory carrying device illustrating the extraction of the chord from the housing according to an embodiment of the present inventions.

Referring to FIGS. 2 and 3, which illustrates the rear view of the hand held personal accessory carrying apparatus 10 comprising the body connector 20 that has a rotation disc 50 formed therein wherein the rotation disc 50 facilitates the rotation of a clip 52. The clip 52 is formed from a substantially flat, substantially elongated rectangular shaped metal plate having a first end, which is not shown, as it is encased within the rotation disc 50 following the insertion of the first end of clip 50 through a slot within the rotation disc 50. The clip also has a second end 54. As illustrated, the body connector 20 includes an orifice 40 through which the chord 42 is extendable from and retractable into the body connector 20 under the tension of a spring (not shown). The chord 42 in the preferred embodiment is a parachute chord. However it is to be understood that the chord 42 may be comprised of any material that facilitates the attachment of the body connector 20 to the connection fillet 30 without breaking under the force exerted upon the phone carrying device 10 by the user. The chord connector 36 that is attached to an end of the chord 42 has a cavity into which a second rivet 38 is positioned. Rivet 38 attaches the chord connector 36 and the connection fillet 30 in a manner that facilitates the rotation of the chord connector 36 around an axis extending through the center of second rivet 38. The rotational movement of the chord connector 36 facilitates the easy movement of the connection fillet 30 when the connection fillet 30 is detached from the body connector 20 as illustrated in FIG. 3. As illustrated in FIG. 3 the connection fillet 30 may be detached from the body connector 20 by disengaging the snap fastener 60 by pulling the socket portion 62 of the snap fastener 60 away from the stud portion 64 of the snap fastener system 60 that is attached to the body connector 20. As illustrated in FIG. 3 the chord connector 36 rotates around the axis of second rivet 38 in accordance with the force being exerted thereon by chord 42.

Figure 5:
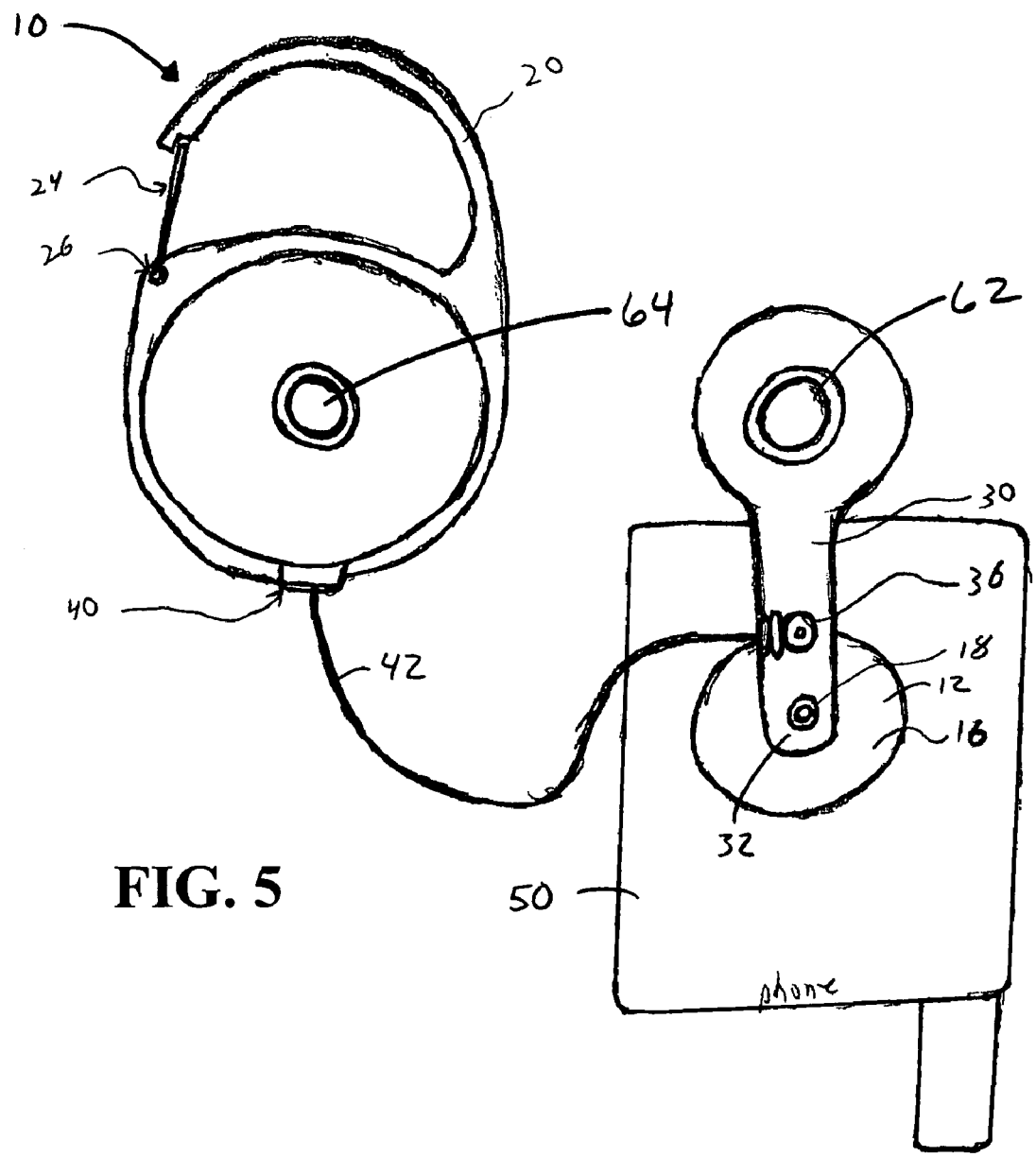
FIG. 5 is a front perspective view of a personal accessory carrying device illustrating the connection of the device to a phone and the extraction of the chord from the housing according to an embodiment of the present inventions.
Figure 6:
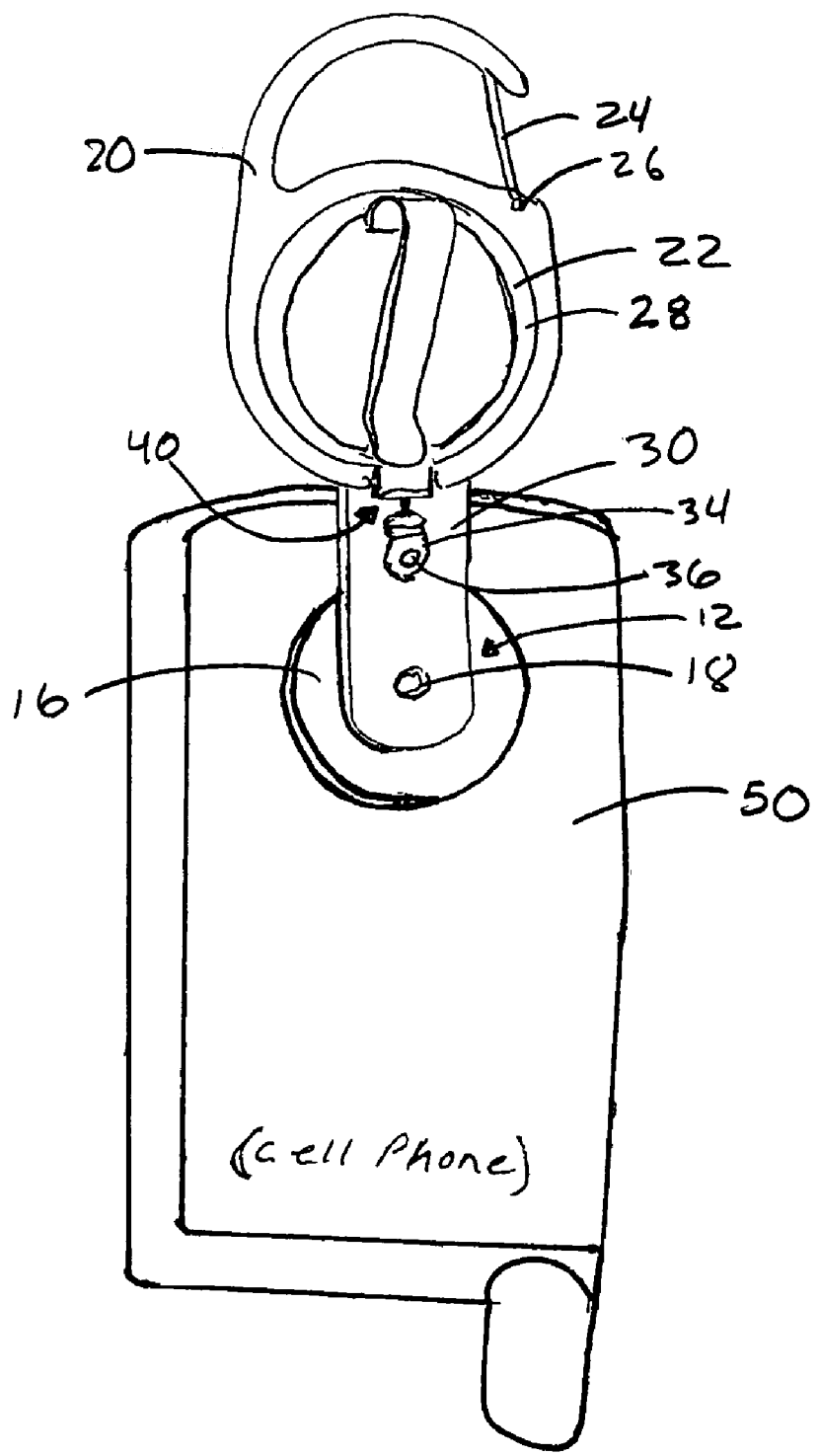
FIG. 6 is a rear perspective view of a personal accessory carrying device illustrating the connection of the device to a phone while the chord is retracted into the device housing according to an embodiment of the present inventions.
Figure 9:
FIG. 9 is a front perspective view of a personal accessory carrying device being used worn by a user while the user is using the hand held device, illustrating the connection of the device to hand held device while the chord extracted from the housing according to an embodiment of the present inventions.

FIGS. 5 and 9 illustrate the personal accessory carrying device 10 wherein the body connector 20 and the connection fillet 30 are detached. The connection fillet 30 has a first end 32 and a second end second end 34. The first end 32 has a first rivet 18 that extends through the first end 32 of the connection fillet 30, proximately through the center of connection disc 12. The connection disc 12 is attached to a cell phone 50. Movement of the cell phone 50 in any direction that may cause tension on chord 42 would cause the chord connector 36 to pull upon the connection fillet 30 in the direction of the chord 42, thereby causing the connection fillet 30 to rotate around the axis of the first rivet 18. FIG. 6 illustrates the personal accessory carrying device 10 wherein the body connector 20 and the connection fillet 30 are attached. The connection disc 12 is attached to a cell phone 50.

FIGS. 7 and 8 illustrates an embodiment of the invention wherein the personal accessory carrying device 10 is attached to a pouch, carrying case or holder 68 of a hand-held personal accessory. As illustrated, the personal accessory carrying device 10 comprises a body connector 20, a central connector housing 22, a carabiner clip 24 that rotates about an axis 26, a chord (not shown) and a connection fillet 30. The body connector 20 is engaged by a snap fastener 60, which thereby connects the connection fillet 30 to the body connector 20. The carrying case 68 is riveted directly to the connection fillet 30 by a first rivet that extends through a first end of the connection fillet 30 and through a wall of carrying case 68. The first rivet 18 facilitates the rotation of the connection fillet 30 around an axis extending through the center of the rivet connecting the connection fillet to the wall of carrying case 86. The body connector 20 of the present invention is of the type manufactured and sold by Tombo Industries Co. Limited, of Kwun Tong, KLN, Hong Kong and Benison Industrial Co. Limited, of New Territories Hong Kong.

While the invention has been particularly shown and described with reference to preferred embodiments thereof, it will be understood by those skilled in the art that various other changes in the form and details ma be made therein without departing from the spirit and scope of the invention. The foregoing description of the exemplary embodiments of the invention has been presented for purposes of illustration and description. It is not intended to be exhaustive or to limit the invention to the precise form disclosed. Man modifications and variations are possible in light of the above teaching. It is intended that the scope of the invention be limited not with this detailed description but rather by the claims appended hereto.

I claim:

1. An apparatus configured to mount a device to a user's body comprising:
   a housing having a chord and a spring within said housing, said chord extendable from and retractable into said housing under the tension of said spring, said housing having a first portion of a snap fastener extending therefrom;
   a chord connector attached to an end of said chord;
   a connection disk having a first rivet positioned through its center, wherein a first side of said connection disk is attached to the device;
   a connection fillet having first and second ends, wherein said connection fillet is configured with said first rivet extending through said connection fillet first end, thereby connecting said connection fillet to said connection disk, said connection fillet having a second portion of a snap fastener attached to said connection fillet second end;

wherein said chord connector is connected to said connection fillet, and said first and second snap fastener portions are engaged to detachably connect said connection fillet to said housing.

2. The apparatus of claim 1 wherein the device mounted to the body of a user is a communication device.

3. The apparatus of claim 1 wherein the device mounted to the body of a user is a carrying case into which a communication device is mounted.

4. The apparatus of claim 1 wherein the housing includes a carabiner clip that facilitates the connection of the housing.

5. The apparatus of claim 1 wherein said first side of said connection disk includes an adhesive that facilitates attachment of said first side of said connection disk to the device.

6. The apparatus of claim 1 wherein said second portion of said snap fastener comprises a snap fastener socket.

7. The apparatus of claim 1 wherein said housing has a first side and a second side, wherein said second side has said first portion of said snap fastener extending there from.

8. The apparatus of claim 7 wherein said first portion of said snap fastener extending from said second side of said housing comprises a snap fastener stud.

9. The apparatus of claim 7 wherein said first side of said housing includes a belt clip assembly mounted thereto, wherein said belt clip assembly comprises a rotatable member and a clip connected to said rotatable member wherein said clip is configured to mount said apparatus to the body of a user.

10. The apparatus of claim 1 wherein said connection fillet first end rotates around the axis extending through the center of said rivet.

11. The apparatus of claim 1 wherein the device is one from the group consisting of a GPS device, PDA, cell phone, pager, MP3 player or MPeg 4 player.

12. The apparatus of claim 1 wherein said first and second snap fastener portions comprise a mounting mechanism that facilitates the detachable mount of the device to said housing, wherein the device may be detached from the housing by pulling the device and detaching said first snap fastener member portion from said second snap fastener member portion.

13. The apparatus of claim 1 wherein said first rivet extends through said connection fillet proximate the center of said connection fillet first end and rotatably attaches said connection fillet to said connection disk, thereby facilitating the rotation of said connection fillet around an axis extending through the center of said first rivet.

14. The apparatus of claim 1, wherein said chord connector is connected to said connection fillet by a second rivet, thereby facilitating the rotation of said chord connector about the axis extending through the center of said second rivet.

15. An apparatus configured to mount a device to a user's body comprising:
a housing having a chord and a spring within said housing, said chord extendable from and retractable into said housing under the tension of said spring wherein said housing is configured with a carabiner clip facilitating connection of said housing to the user's body;
a device connector comprising a thin durable material having a rivet positioned proximate and through the center of said device connector, wherein a first side of said device connector is permanently attached to the device;
a connection fillet having first and second ends, wherein said connection fillet is configured with said connection rivet extending through said connection fillet first end, thereby permanently and rotatably connecting said connection fillet to said device connector, said connection fillet being attached to said chord;
a snap fastener assembly having a socket and a stud, wherein said stud is connected to and extends from said housing and said socket is connected to and extends from said connection fillet, wherein said stud and said socket engage to detachably connect said connection fillet to said housing.

16. An apparatus configured to mount a hand held device to a user's body comprising:
a housing having a chord and a spring within said housing, said chord extendable from and retractable into said housing under the tension of said spring;
a device housing configured to removably house said hand held device, wherein said device housing has a first rivet extending through a first side of said device housing;
a connection fillet having first and second ends, wherein said connection fillet is configured with said first rivet extending through said connection fillet first end, thereby permanently and rotatably connecting said connection fillet to said device housing,
a chord connector attached to an end of said chord and attached to said connection fillet; and
a snap fastener having a female portion and a male portion, wherein said male portion extends from said housing and said male portion extends from said connection fillet, wherein said male and female portions are engaged to detachably connect said connection fillet to said housing.

17. The apparatus of claim 16 wherein the hand held device is one from the group consisting of a GPS device, PDA, cell phone, pager, MP3 player or media player.

18. The apparatus of claim 16, wherein said chord connector is connected to said connection fillet by a second rivet, thereby facilitating the rotation of said chord connector about the axis extending through the center of said second rivet.

\* \* \* \* \*